(12) United States Patent
Chung et al.

(10) Patent No.: US 9,196,196 B2
(45) Date of Patent: Nov. 24, 2015

(54) PIXEL AND ORGANIC LIGHT EMITTING DISPLAY DEVICE USING THE SAME

(75) Inventors: Bo-Yong Chung, Yongin (KR); Yong-Sung Park, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 1128 days.

(21) Appl. No.: 12/873,153

(22) Filed: Aug. 31, 2010

(65) Prior Publication Data
US 2011/0193850 A1 Aug. 11, 2011

(30) Foreign Application Priority Data

Feb. 9, 2010 (KR) .................. 10-2010-0011905

(51) Int. Cl.
| | |
|---|---|
| G09G 3/30 | (2006.01) |
| H05B 37/00 | (2006.01) |
| G06F 3/038 | (2013.01) |
| G09G 3/32 | (2006.01) |
| H05B 33/08 | (2006.01) |

(52) U.S. Cl.
CPC .......... *G09G 3/3233* (2013.01); *H05B 33/0824* (2013.01); *H05B 33/0845* (2013.01); *H05B 33/0896* (2013.01); *G09G 2300/0819* (2013.01); *G09G 2300/0852* (2013.01); *G09G 2300/0861* (2013.01); *G09G 2320/0223* (2013.01); *G09G 2320/043* (2013.01); *G09G 2320/045* (2013.01)

(58) Field of Classification Search
CPC .................................................... G09G 3/3696
USPC ......................................................... 345/212
See application file for complete search history.

(56) References Cited

U.S. PATENT DOCUMENTS

| | | | |
|---|---|---|---|
| 7,646,366 B2 * | 1/2010 | Ha et al. ...................... | 345/82 |
| 7,710,368 B2 * | 5/2010 | Chung ........................ | 345/82 |

(Continued)

FOREIGN PATENT DOCUMENTS

| | | |
|---|---|---|
| JP | 2002-082651 | 3/2002 |
| JP | 2007-316454 | 12/2007 |

(Continued)

OTHER PUBLICATIONS

KIPO Office action dated Jun. 23, 2011 in priority Korean application No. 10-2010-0011905, 1 sht.

(Continued)

*Primary Examiner* — Kathy Wang-Hurst
*Assistant Examiner* — Peijie Shen
(74) *Attorney, Agent, or Firm* — Christie, Parker & Hale, LLP

(57) ABSTRACT

There is provided an organic light emitting display device for providing a compensation period of a threshold voltage. The organic light emitting display device includes: a scan driver configured to supply a plurality of scan signals to a plurality of scan lines, each of the scan signals having a width greater than two horizontal periods; a data driver configured to supply a plurality of data signals to a plurality of data lines; and a pixel including an organic light emitting diode, a pixel circuit having a first transistor for controlling an amount of current supplied to the organic light emitting diode, and a compensation circuit configured to control a voltage of a gate electrode of the first transistor to compensate for deterioration of the organic light emitting diode; wherein the scan driver is configured to supply a current scan signal which partially overlaps in time with a previous scan signal.

22 Claims, 7 Drawing Sheets

(56) References Cited

U.S. PATENT DOCUMENTS

| | | | |
|---|---|---|---|
| 8,558,767 B2* | 10/2013 | Kwon | 345/77 |
| 2004/0125046 A1* | 7/2004 | Yamazaki et al. | 345/1.3 |
| 2006/0077138 A1* | 4/2006 | Kim | 345/76 |
| 2006/0097966 A1* | 5/2006 | Choi | 345/77 |
| 2006/0145964 A1* | 7/2006 | Park et al. | 345/76 |
| 2008/0036710 A1* | 2/2008 | Kim | 345/82 |
| 2008/0111804 A1* | 5/2008 | Choi et al. | 345/205 |
| 2009/0027310 A1* | 1/2009 | Kim | 345/76 |
| 2009/0109150 A1* | 4/2009 | Han et al. | 345/82 |
| 2009/0146987 A1* | 6/2009 | Kim et al. | 345/212 |
| 2009/0231308 A1* | 9/2009 | Numao | 345/204 |
| 2011/0199357 A1* | 8/2011 | Chung et al. | 345/211 |

FOREIGN PATENT DOCUMENTS

| | | |
|---|---|---|
| JP | 2008-146051 | 6/2008 |
| KR | 10-2007-0119274 A | 12/2007 |
| KR | 10-2008-0080754 A | 9/2008 |
| KR | 10-2009-0059384 A | 6/2009 |

OTHER PUBLICATIONS

KIPO Office action dated Jun. 23, 2011 for Korean Patent application 10-2010-0014111, (1 page).

U.S. Office action dated Nov. 8, 2013, issued to cross reference U.S. Appl. No. 12/888,285, (17 pages).

* cited by examiner

PIXEL AND ORGANIC LIGHT EMITTING DISPLAY DEVICE USING THE SAME

CROSS-REFERENCE TO RELATED APPLICATION

This application claims priority to and the benefit of Korean Patent Application No. 10-2010-0011905, filed on Feb. 9, 2010, in the Korean Intellectual Property Office, the entire disclosure of which is incorporated herein by reference.

BACKGROUND

1. Field

Aspects of embodiments according to the present invention relate to a pixel and an organic light emitting display device using the same.

2. Description of the Related Art

Recently, various flat panel display devices having reduced weight and volume and to address disadvantages such as a large weight and volume of a cathode ray tube have been developed. There are various flat panel displays such as a liquid crystal display (LCD), a field emission display (FED), a plasma display panel (PDP), and an organic light emitting display.

The organic light emitting display among the flat panel displays is a device for displaying an image using organic light emitting diodes for emitting light when electrons and holes are re-combined, and has a rapid response and low power consumption.

The organic light emitting display device includes a plurality of pixels arranged at crossing regions of a plurality of data lines, a plurality of scan lines, and power lines arranged in a matrix form. Each of the pixels includes an organic light emitting diode, at least two transistors including a driving transistor, and at least one capacitor.

The organic light emitting display device has low power consumption, but the amount of current flowing to the organic light emitting diodes varies due to differences in threshold voltages of the driving transistors that are respectively included in the pixels so that an image is not displayed with uniform brightness. That is, characteristics of the driving transistors vary due to the manufacturing process of the driving transistors included in the pixels. Actually, it is practically impossible to manufacture all transistors of the organic light emitting display device to have the same characteristics in the current manufacturing process, and therefore the differences in threshold voltages of the driving transistors occur.

SUMMARY

Aspects of embodiments according to the present invention are directed to providing a pixel for having a sufficient compensation period of a threshold voltage and an organic light emitting display device using the same.

In order to achieve the foregoing and/or other aspects of the present invention, there is provided an organic light emitting display device including: a scan driver configured to supply a plurality of scan signals to a plurality of scan lines, each of the scan signals having a width greater than two horizontal periods; a data driver configured to supply a plurality of data signals to a plurality of data lines; and a pixel including an organic light emitting diode, a pixel circuit having a first transistor configured to control an amount of current supplied to the organic light emitting diode, and a compensation circuit configured to control a voltage of a gate electrode of the first transistor to compensate for deterioration of the organic light emitting diode; wherein the scan driver is configured to supply a current scan signal which partially overlaps in time with a previous scan signal.

In some embodiments, the scan driver supplies the scan signal for a period having a time length of three horizontal periods. The current scan signal may overlap with the previous scan signal for a period having a time length of two horizontal periods. The scan driver may be configured to sequentially supply a plurality of light emission control signals to a plurality of light emission control lines extending in a direction parallel to the scan lines, and to supply an ith light emission control signal to an ith light emission control line of the light emission control lines overlaps in time with scan signals of the scan signals supplied to an (i−2)th scan line to an (i+3)th scan line.

In another embodiment, there is provided a pixel including: an organic light emitting diode; a first transistor configured to control an amount of current supplied to the organic light emitting diode; a second transistor coupled between a first node at a gate electrode of the first transistor and a first electrode of the first transistor and configured to be turned on when an ith scan signal is supplied to an ith scan line; a third transistor coupled to a data line and a second node and configured to be turned on when an (i+3)th scan signal is supplied to an (i+3)th scan line; a first capacitor coupled to the first node and a second node; a fourth transistor coupled to the second node and a reference power source and configured to be turned on when the ith scan signal is supplied to the ith scan line; a fifth transistor coupled between the first electrode of the first transistor and a first power source and configured to be turned off when a light emission control signal is supplied to an ith light emission control line; a sixth transistor coupled between the first node and the first power source and configured to be turned on when an (i−2)th scan signal is supplied to an (i−2)th scan line; a second capacitor coupled between an anode electrode of the organic light emitting diode and the first node or the second node; and a compensation circuit configured to control a voltage of the first node to compensate for deterioration of the organic light emitting diode.

The reference power source may have a voltage higher than a voltage of a data signal corresponding to a black gray level and lower than a voltage of a data signal corresponding to a white gray level. The compensation circuit may include: a seventh transistor coupled between a control power source and a fourth node; an eighth transistor coupled between the fourth node and an anode electrode of the organic light emitting diode; and a third capacitor coupled between the fourth node as a common node of the seventh transistor and the eighth transistor and the first node or the second node, wherein the seventh and eight transistors are configured such that at most one of the seventh and eighth transistors is turned on at any time. A voltage of the control power source may be substantially equal to that of the reference power source. The control power source may have a voltage lower than a threshold voltage of the organic light emitting diode. The control power source may have a voltage higher than a threshold voltage of the organic light emitting diode.

According to one embodiment of the present invention, in a pixel and the organic light emitting display using the same, the threshold voltage of the driving transistor can be compensated for over a period longer than two horizontal periods so that an image of a desired brightness can be displayed even in a high frequency driving mode. In addition, the compensation circuit can compensate for deterioration of the organic light emitting diode so that an image of desired brightness can be displayed regardless of the deterioration of the organic light emitting diode.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
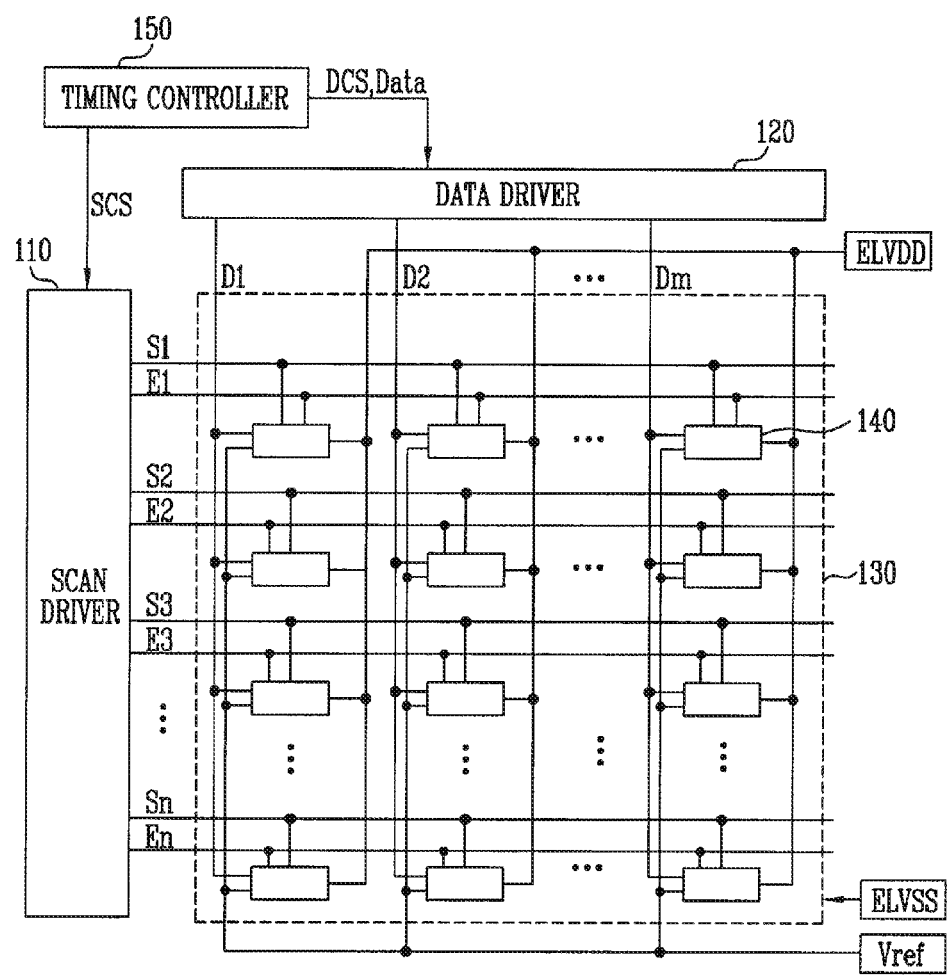
FIG. 1 is a schematic view illustrating an organic light emitting display device according to one embodiment of the present invention.

Hereinafter, certain exemplary embodiments according to the present invention will be described with reference to the accompanying drawings. Here, when a first element is described as being coupled to a second element, the first element may be directly coupled to the second element or may be indirectly coupled to the second element via a third element. Further, some of the elements that are not essential to a complete understanding of the invention are omitted for clarity. Also, like reference numerals refer to like elements throughout.

In order to reduce or solve the problems associated with threshold voltage variation in organic light emitting display devices, a method of adding a compensation circuit including a plurality of transistors and capacitors to the pixels has been suggested. The compensation circuit included in the pixel stores a voltage corresponding to the threshold voltage of the driving transistor so that the difference between threshold voltages of the driving transistors is compensated.

In order to reduce or remove motion blur, a method of driving the pixels at a frequency higher than 120 Hz may be used. However, when the driving frequency is higher than 120 Hz, the charging period for compensating for the threshold voltage of the driving transistor becomes short and therefore it is difficult or impossible to compensate for the threshold voltage of the driving transistor.

Hereinafter, the embodiments of the present invention will be described in detail with reference to FIGS. 1-9.

FIG. 1 is a schematic view illustrating an organic light emitting display device according to one embodiment of the present invention.

Referring to FIG. 1, an organic light emitting display device according to one embodiment of the present invention includes a display unit 130 including pixels 140 that are positioned at crossing regions of scan lines S1 to Sn, light emission control lines E1 to En, and data lines D1 to Dm, a scan driver 110 for driving the scan lines S1 to Sn and the light emission control lines E1 to En, a data driver 120 for driving the data lines D1 to Dm, and a timing controller 150 for controlling the scan driver 110 and the data driver 120.

The scan driver 110 receives a scan driver control signal SCS from the timing controller 150. The scan driver 110, which receives the scan driver control signal SCS, generates a plurality of scan signals and supplies the generated scan signals to the scan lines S1 to Sn sequentially.

The scan driver 110 supplies the scan signals to their respective scan lines S1 to Sn, each of the scan signals having a width greater than two horizontal periods (2H) and overlapping with a scan signal applied to a previous scan line. For the sake of convenience, it is assumed that the scan signal has a width of 3H and a scan signal supplied to an ith (i is a natural number) scan line overlaps with a scan signal supplied to an (i−1)th scan line for a period of 2H (i.e., two horizontal periods). That is, the scan driver begins to supply the ith scan signal one horizontal period after it begins to supply the (i−1)th scan signal.

The scan driver 110, which receives the scan driver control signal SCS, generates a light emission control signal and supplies the generated light emission control signal to the light emission control lines E1 to En sequentially. Here, the ith light emission control signal supplied to the ith light emission control line E1 is overlapped with scan signals that are supplied to an (i−2)th scan line to an (i+3)th scan line.

The data driver 120, receives a data driver control signal DCS from the timing controller 150. The data driver 120, which receives the data driver control signal DCS, supplies a plurality of data signals to the data lines D1 to Dm when the scan signals are supplied.

The timing controller 150 generates the data driver control signal DCS and the scan driver control signal SCS in response to a synchronizing signal supplied from the exterior (or outside the display panel). The data driver control signal DCS generated by the timing controller 150 is supplied to the data driver 120 and the scan driver control signal SCS is supplied to the scan driver 110. The timing controller 150 supplies data supplied from the exterior to the data driver 120.

The display unit 130 receives a first power from a first power source ELVDD, a second power from a second power source ELVSS, and a reference power from a reference power source Vref from the exterior, and supplies the same to the respective pixels 140. Each of the pixels 140 receives the first power, the second power, and the reference power and generates light (or an amount of light) corresponding to the data signal. Here, the first power source ELVDD has a voltage higher than that of the second power source ELVSS and supplies a current (e.g., a predetermined current) to the organic light emitting diode. The voltage of the reference power source Vref is set to a voltage higher than a data signal of a black gray level and lower than that a data signal of a white gray level. This will be described in detail later.

Although FIG. 1 schematically illustrates the pixels 140 as being coupled to a single scan line, actually the pixels 140 are coupled to three scan lines. For example, a pixel positioned at ith horizontal line is coupled to an (i−2)th scan line Si−2, an ith scan line Si, and an (i+3)th scan line Si+3.

Figure 2:
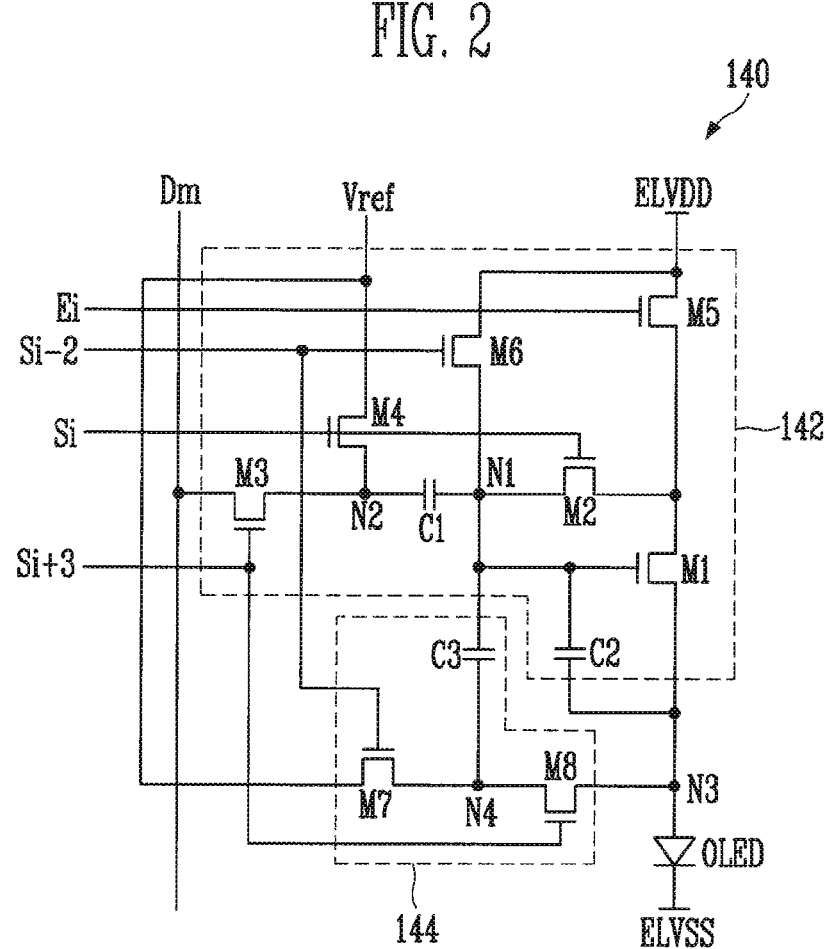
FIG. 2 is a circuit diagram illustrating a pixel according to a first embodiment of the present invention.

FIG. 2 is a circuit diagram illustrating a pixel according to a first embodiment of the present invention. For the sake of convenience, FIG. 2 shows a pixel 140 positioned at the ith horizontal line and coupled to an mth data line Dm.

Referring to FIG. 2, each of the pixels 140 according to the first embodiment of the present invention includes an organic light emitting diode (OLED), a pixel circuit 142 for controlling the amount of current supplied to the OLED, and a compensation circuit 144 for controlling a gate electrode voltage of the driving transistor included in the pixel circuit 142.

An anode electrode of the OLED is coupled to the pixel circuit 142 and a cathode electrode of the OLED is coupled to a second power source ELVSS. As such, the OLED generates light having a brightness (e.g., a predetermined brightness) in response to (or corresponding to) the current supplied from the pixel circuit 142.

The pixel circuit 142 stores a voltage corresponding to a threshold voltage of a first transistor M1 (that is, the driving transistor) for a period where the scan signal is supplied to the ith scan line Si and stores a voltage corresponding to the data signal when the scan signal is supplied to the (i+3)th scan line Si+3. The pixel circuit 142 supplies a current corresponding to the stored voltages to the OLED after the supply of the light emission control signal to the ith light emission control line is stopped. To this end, the pixel circuit 142 includes first to sixth transistors M1 to M6, a first capacitor C1, and a second capacitor C2.

A gate electrode of the first transistor M1 is coupled to a first node N1 and a first electrode of the first transistor M1 is coupled to a second electrode of the fifth transistor M5. A second electrode of the first transistor M1 is coupled to an anode electrode of the OLED (that is, a third node N3). The first transistor M1 controls the amount of current flowing from the first power source ELVDD to the second power source ELVSS via the OLED in response to the voltage applied to the first node N1.

A gate electrode of the second transistor M2 is coupled to the ith scan line Si and a first electrode of the second transistor M2 is coupled to the second electrode of the fifth transistor M5. A second electrode of the second transistor M2 is coupled to the first node N1. The second transistor M2 is turned on when the scan signal is supplied to the ith scan line Si and electrically connects the gate electrode of the first transistor M1 to the first electrode of the first transistor M1. In this case, the first transistor M1 is diode-connected. In one embodiment, the scan signal is a high level (e.g., logic high) signal.

A gate electrode of the third transistor M3 is coupled to an (i+3)th scan line Si+3 and a first electrode of the third transistor M3 is coupled to the data line Dm. A second electrode of the third transistor M3 is coupled to a second node N2. The third transistor M3 is turned on when the scan signal is supplied to the (i+3)th scan line Si+3 and electrically connects the data line Dm to the second node N2.

A gate electrode of the fourth transistor M4 is coupled to the ith scan line Si and a first electrode of the fourth transistor M4 is coupled to the reference power source Vref. A second electrode of the fourth transistor M4 is coupled to the second node N2. The fourth transistor M4 is turned on when the scan signal is supplied to the ith scan line Si and supplies a voltage of the reference power source Vref to the second node N2.

A gate electrode of the fifth transistor M5 is coupled to the light emission control line Ei and a first electrode of the fifth transistor M5 is coupled to the first power source ELVDD. A second electrode of the fifth transistor M5 is coupled to the first electrode of the first transistor M1. The fifth transistor M5 is turned off when the light emission control signal is supplied to the light emission control line Ei and is turned on in other cases. In one embodiment, the light emission control signal is a low level (e.g., logic low) signal.

A gate electrode of the sixth transistor M6 is coupled to an (i−2)th scan line Si−2 and a first electrode of the sixth transistor M6 is coupled to the first power source ELVDD. A second electrode of the sixth transistor M6 is coupled to the first node Ni and the sixth transistor M6 is turned on when the scan signal is supplied to the (i−2)th scan line Si−2 and supplies the voltage of the first power source ELVDD to the first node N1.

The first capacitor C1 is coupled between the first node N1 and the second node N2. The first capacitor C1 stores a voltage corresponding to the threshold voltage of the first transistor M1.

The second capacitor C2 is coupled between the first node N1 and a third node N3. The second capacitor C2 stores a voltage corresponding to the data signal.

The compensation circuit 144 controls a voltage of the gate electrode of the first transistor M1 (that is, the voltage of the first node N1) to compensate for deterioration of the OLED. To this end, the compensation circuit 144 includes a seventh transistor M7, an eighth transistor M8, and a third capacitor C3.

A gate electrode of the seventh transistor M7 is coupled to the (i−2)th scan line Si−2 and a first electrode of the seventh transistor M7 is coupled to the reference power source Vref. A second electrode of the seventh transistor M7 is coupled to a fourth node N4. The seventh transistor M7 is turned on when the scan signal is supplied to the (i−2)th scan line Si−2 and supplies the voltage of the reference power source Vref to the fourth node N4.

A gate electrode of the eighth transistor M8 is coupled to the (i+3)th scan line Si+3 and a first electrode of the eighth transistor M8 is coupled to the third node N3. A second electrode of the eighth transistor M8 is coupled to the fourth node N4. The eighth transistor M8 is turned on when the scan signal is supplied to the (i+3)th scan line Si+3 and supplies the voltage of the third node N3 (that is, a voltage applied to the anode electrode of the OLED) to the fourth node N4. In practice, the seventh transistor M7 and the eighth transistor M8 are turned on at different times (i.e., so that at most one of the seventh and eighth transistors is turned on at any time) and change the voltage of the fourth node N4 to that of the reference power source Vref or the voltage of the third node N3, respectively.

The third capacitor C3 is coupled between the first node N1 and the fourth node N4. The third capacitor C3 controls the voltage of the first node N1 in response to the voltage of the fourth node N4. Here, since the voltage of the fourth node N4 changes according to the deterioration of the OLED, the voltage of the first node N1 is controlled to compensate for deterioration of the OLED. This will be described in detail later.

Figure 3:
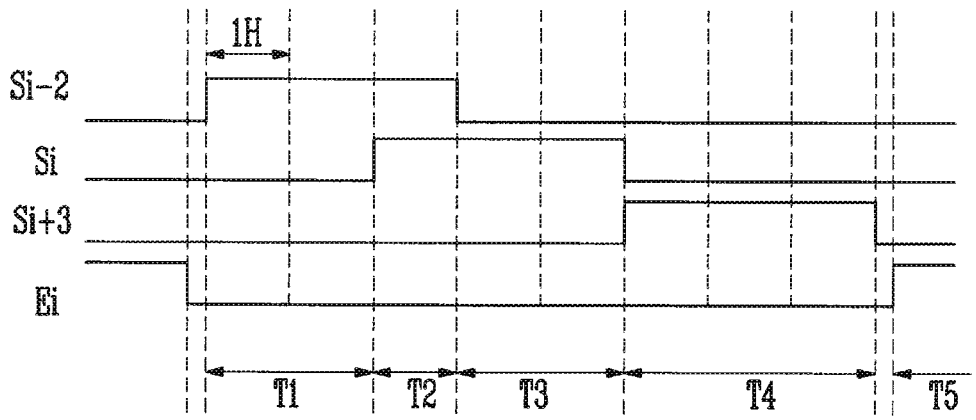
FIG. 3 is a waveform diagram illustrating a driving method of the pixel of FIG. 2.

FIG. 3 is a waveform diagram illustrating a driving method of the pixel of FIG. 2.

Referring to FIG. 3, first, the light emission control signal is supplied to the light emission control line E1 from a first period T1 through a fourth period T4. When the light emission control signal is supplied to the light emission control line Ei, the fifth transistor M5 is turned off.

The scan signal is supplied to the (i−2)th scan line Si−2 during the first period T1. When the scan signal is supplied to the (i−2)th scan line Si−2, the sixth transistor M6 and the seventh transistor M7 are turned on.

When the sixth transistor M6 is turned on, the voltage of the first power source ELVDD is supplied to the first node N1. When the seventh transistor M7 is turned on, the voltage of the reference power source Vref is supplied to the fourth node N4. Voltages of the first node N1 and the fourth node N4 are substantially uniform during the first period T1.

The scan signal is supplied to the ith scan line Si during the second period T2. When the scan signal is supplied to the ith scan line Si, the second transistor M2 and the fourth transistor M4 are turned on. When the fourth transistor M4 is turned on, the voltage of the reference power source Vref is supplied to the second node N2. When the second transistor M2 is turned on, the first transistor M1 is diode-connected.

The supply of the scan signal to the (i−2)th scan line Si−2 is stopped during the third period 13. When the supply of the scan signal to the (i−2)th scan line Si−2 is stopped, the sixth transistor M6 is turned off. When the sixth transistor M6 is turned off, the voltage of the first node N1 is set to the sum of a threshold voltage Vth of the first transistor M1 and a threshold voltage Vto of the OLED (that is, a voltage applied to the third node N3). At this time, a voltage corresponding to a difference between the first node N1 and the second node N2 is stored in the first capacitor C1. That is, a voltage corresponding to the threshold voltage of the first transistor M1 is stored in the first capacitor C1.

Figure 4:
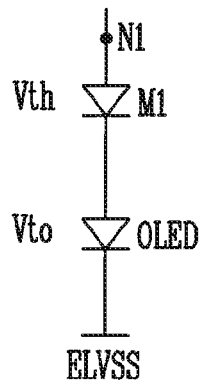
FIG. 4 is a view schematically illustrating a voltage applied to a first node of FIG. 1.

In detail, when the sixth transistor M6 is turned off, the first power is not supplied to the first node N1. When the sixth transistor M6 is turned off, the second transistor M2 maintains the turned-on state. In this case, the first transistor M1, as illustrated in FIG. 4, may be equivalent to a diode during the third period 13. In this case, the voltage of the first node N1 is lowered to the sum of the threshold voltage Vth of the first transistor M1 and a threshold voltage Vto of the OLED.

The scan signal is supplied to the (i+3)th scan line Si+3 for the fourth period T4. When the scan signal is supplied to the (i+3)th scan line Si+3, the third transistor M3 and the eighth transistor M8 are turned on. When the third transistor M3 is turned on, the data signal is supplied from the data line Dm to the second node N2.

Here, since the third transistor M3 maintains the turned-on state for a period of 3H, data signals corresponding to an (i−2)th horizontal line, an (i−1)th horizontal line, and a current horizontal line are sequentially supplied to the second node N2. In this case, the data signal corresponding to the current horizontal line is finally supplied to the second node N2, and therefore stable driving is possible. When the voltage of the data signal is supplied to the second node N2, the voltage of the second node N2 is changed from the voltage of the reference power source Vref to the voltage of the data signal. The voltage of the first node N1 set to a floating state varies according to a voltage variation of the second node N2, and therefore the first capacitor C1 maintains the voltage corresponding to the threshold voltage of the first transistor M1.

Figure 5:
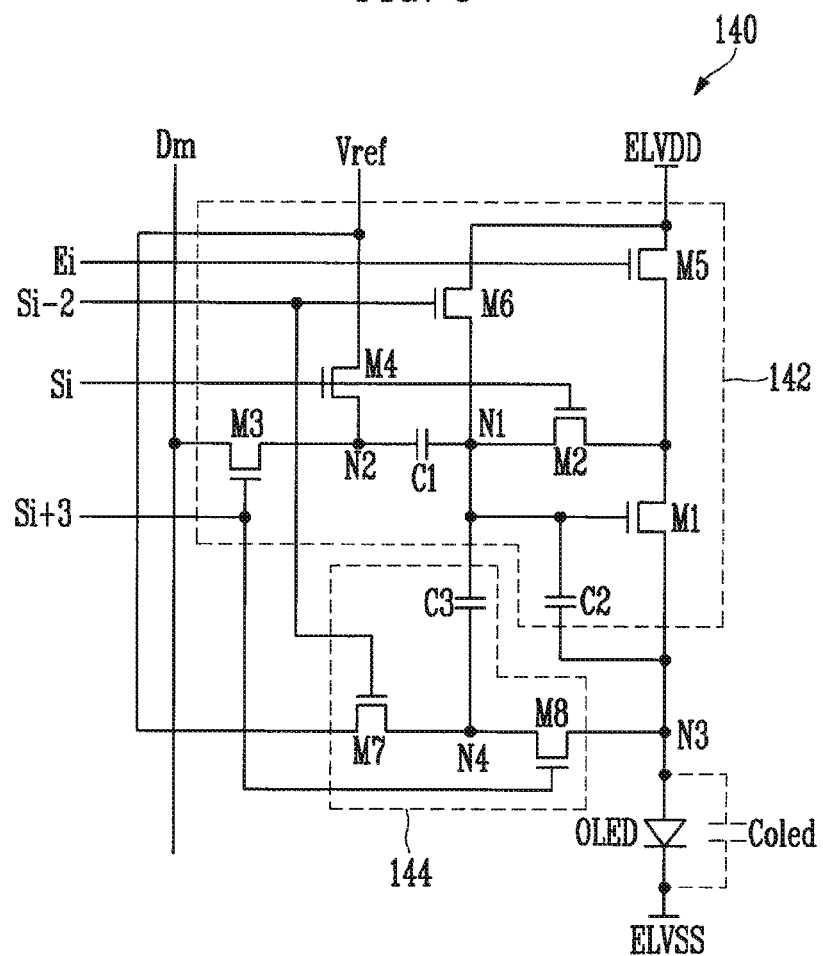
FIG. 5 is a circuit diagram illustrating a parasitic capacitance of the organic light emitting diode of FIG. 2.

Meanwhile, regardless of the voltage change of the first node N1, the voltage of the third node N3 maintains (or remains at) the threshold voltage Vto of the OLED. Therefore, a voltage corresponding to the data signal is stored in the second capacitor C2 during the fourth period T4. In detail, a parasitic capacitance Coled, as illustrated in FIG. 5, is formed in the OLED. Here, a capacitance of the parasitic capacitance Coled formed in the OLED is set larger than that of the second capacitor C2. Therefore, although the voltage of the first node N1 is changed, the voltage of the third node N3 may only slightly change.

Meanwhile, the voltage of the reference power source Vref is set to a voltage higher than that of a data signal of a black (or darkest) gray level and lower than that of a data signal of a white (or brightest) gray level. In detail, when a data signal corresponding to a white gray level is supplied, the voltage of the second node N2 rises from the voltage of the reference power source Vref to a voltage corresponding to the white gray level data signal. At this time, the voltage of the first node N1 rises according to the rise of the voltage of second node N2 and a voltage corresponding to this is stored in the second capacitor C2.

Meanwhile, when a data signal corresponding to the black gray level is supplied, the voltage of the second node N2 is lowered from the voltage of the reference power source Vref to a voltage corresponding to the black gray level data signal. At this time, the voltage of the first node N1 is lowered according to the lowering of the voltage of second node N2 and a voltage corresponding to this is stored in the second capacitor C2. That is, in a case of expressing black, the voltage of the first node N1 is lowered and the first transistor M1 is set to the turned-off state. In a case of expressing white, the voltage of the first node N1 rises and the first transistor M1 is set to the turned-on state. In a case of expressing other gray levels, a data signal is used to control the voltage rise or fall of the first node N1.

When the eighth transistor M8 is turned on during the fourth period T4, the threshold voltage Vto of the OLED is supplied to the fourth node N4. When the threshold voltage Vto of the OLED is supplied, the voltage of the fourth node N4 is changed from the voltage of the reference power source Vref to the threshold voltage Vto of the OLED. At this time, the voltage of the first node N1 is changed according to the voltage change of the fourth node N4 and therefore the deterioration of the OLED can be compensated for.

In detail, the threshold voltage Vto of the OLED rises as the OLED deteriorates. Here, assuming that the voltage of the reference power source Vref is lower than the threshold voltage Vto of the OLED, the voltage rises of the fourth node N4 and the first node N1 increase as the OLED deteriorates. In this case, the amount of current supplied to the OLED increases as the OLED deteriorates and the deterioration of the OLED can be compensated by increasing the amount of current.

Assuming that the voltage of the reference power source Vref is higher than the threshold voltage Vto of the OLED, the voltage rises of the fourth node N4 and the first node N1 decrease as the OLED deteriorates. That is, the voltage of the first node is set to a high voltage as the OLED deteriorates in response to the same data signal, and therefore deterioration of the OLED can be compensated for.

The supply of the light emission control signal to the ith light emission control line Ei is stopped for the fifth period T5. When the supply of the light emission control signal to the ith light emission control line Ei is stopped, the fifth transistor M5 is turned on. When the fifth transistor M5 is turned on, the first electrode of the first transistor M1 is electrically coupled to the first power source ELVDD. At this time, the first transistor M1 supplies current corresponding to the voltage applied to the first node N1 from the first power source ELVDD to the second power source ELVSS via the OLED. Here, the voltage applied to the first node N1 is set to a voltage corresponding to the threshold voltage of the first transistor M1 and the data signal, and therefore the current supplied from the first transistor M1 to the OLED is set regardless of the threshold voltage of the first transistor M1. Therefore, the described embodiment of the present invention can display an image of substantially uniform brightness.

In the described embodiment of the present invention as described above, the third period T3 when the threshold voltage of the driving transistor is compensated is set to a period of 2H (i.e., has a time length of two horizontal periods). Therefore, even when driving at a frequency higher than 120 Hz, the threshold voltage of the driving transistor can be compensated for. Although FIG. 3 shows the third period T3 as having a length of 2H (or two horizontal periods), embodiments of the present invention are not limited thereto. For example, a supply time of the scan signal may be set longer than 4H (or four horizontal periods) and the threshold voltage can thereby be controlled to be compensated for a sufficient period.

Figure 6:
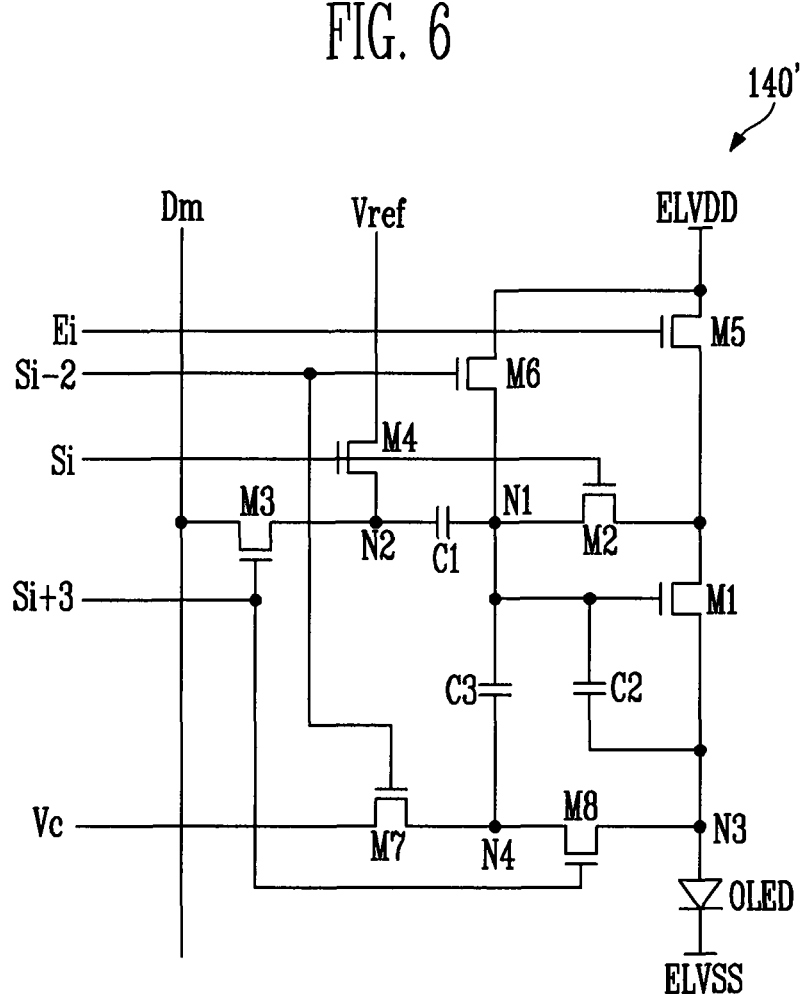
FIG. 6 is a circuit diagram illustrating a pixel according to a second embodiment of the present invention.

FIG. 6 is a circuit diagram illustrating a pixel according to a second embodiment of the present invention. In the description of FIG. 6, the same reference numerals as those in FIG. 2 are assigned to like elements and their descriptions will be omitted.

Referring to FIG. 6, in a pixel 140' according to the second embodiment of the present invention, a seventh transistor M7 is coupled to a control power source Vc. In other words, in the second embodiment of the present invention, a first electrode of the seventh transistor M7 is coupled to the control power source Vc which is different from the reference power source Vref. A voltage of the control power source Vc is set to a voltage higher or lower than the threshold voltage Vto of the OLED.

Figure 7:
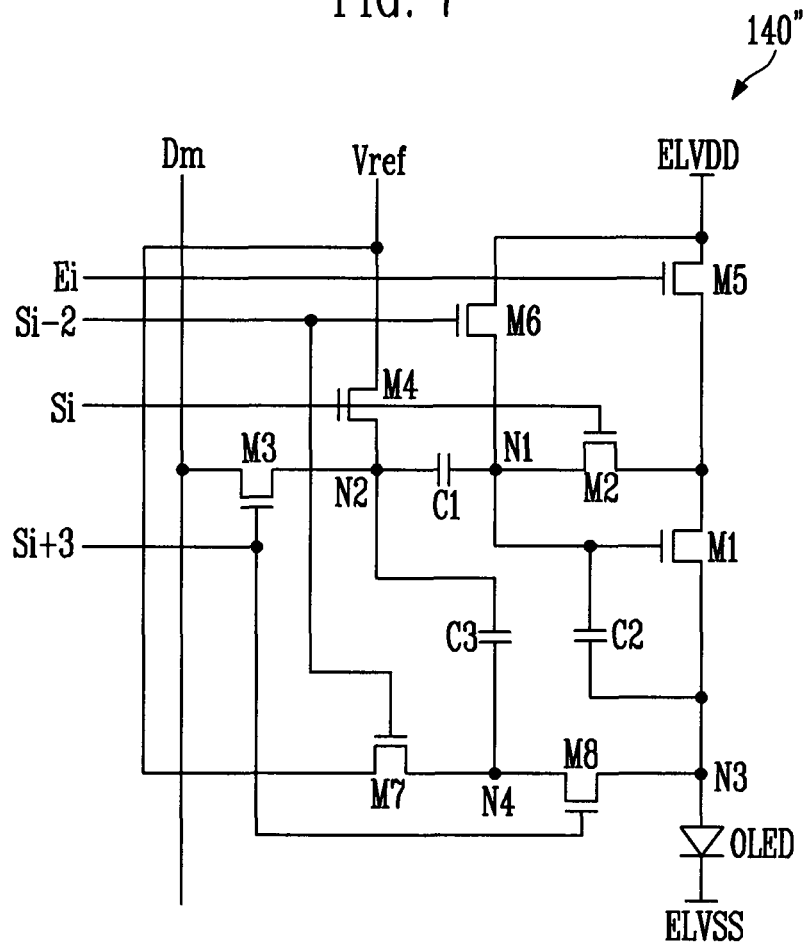
FIG. 7 is a circuit diagram illustrating a pixel according to a third embodiment of the present invention.

FIG. 7 is a circuit diagram illustrating a pixel according to a third embodiment of the present invention. In the description of FIG. 7, the same reference numerals as those in FIG. 2 are assigned to like elements and their descriptions will be omitted.

Referring to FIG. 7, in a pixel 140" according to the third embodiment of the present invention, a third capacitor C3 is coupled between the second node N2 and the fourth node N4. The third capacitor C3 controls the voltage of the second node N2 in response to the voltage change of the fourth node N4. Since the voltage of the first node N1 is changed in response to the voltage change of the second node N2, the voltage of the first node N1 can be controlled stably in response to the deterioration of the OLED.

Figure 8:
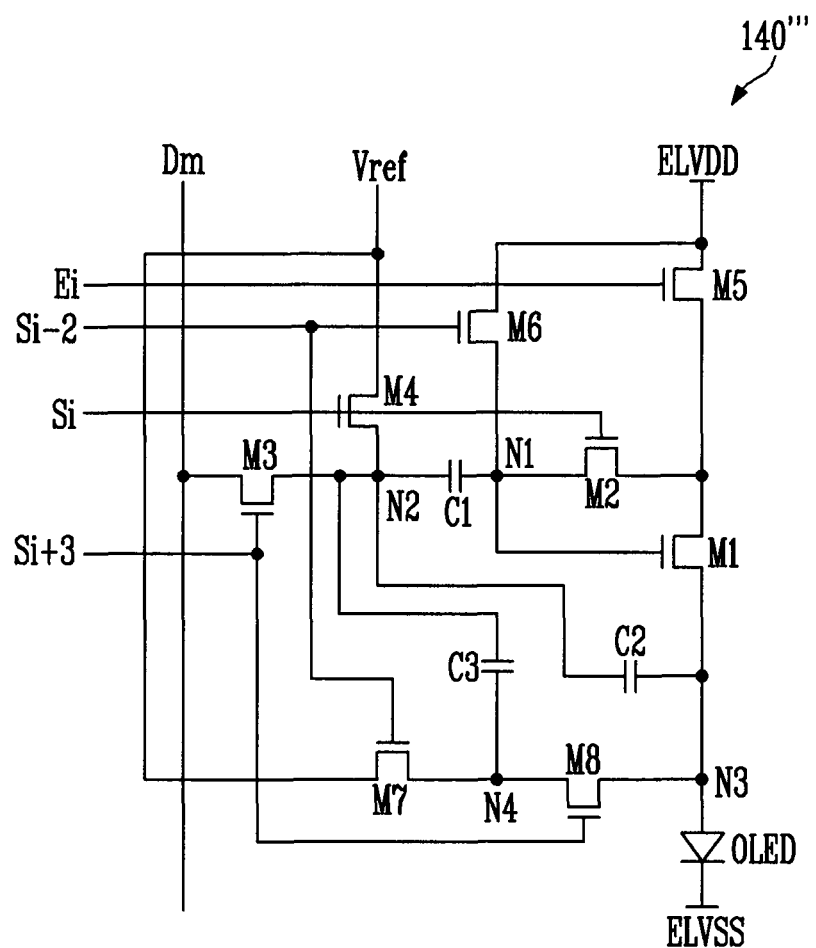
FIG. 8 is a circuit diagram illustrating a pixel according to a fourth embodiment of the present invention.

FIG. 8 is a circuit diagram illustrating a pixel according to a fourth embodiment of the present invention. In the description of FIG. 8, the same reference numerals as those in FIG. 2 are assigned to like elements and their descriptions will be omitted.

Referring to FIG. 8, in a pixel 140''' according to the fourth embodiment of the present invention, a third capacitor C3 is coupled between the second node N2 and the fourth node N4 and a second capacitor C2 is coupled between the third node N3 and the fourth node N4.

The third capacitor C3 controls the voltage of the second node N2 in response to the voltage change of the fourth node N4. In this case, since the voltages of the second node N2 and the first node N1 that are coupled to the second node N2 and the first capacitor C1 are changed according to the voltage change of the fourth node N4, the deterioration of the OLED can be compensated for.

The second capacitor C2 stores a voltage corresponding to a difference voltage between the data signal applied to the second node N2 and the third node N3. The second capacitor C2 stores a voltage corresponding to the voltage change of the second node N2 and therefore the voltage corresponding to the data signal can be stably charged.

Figure 9:
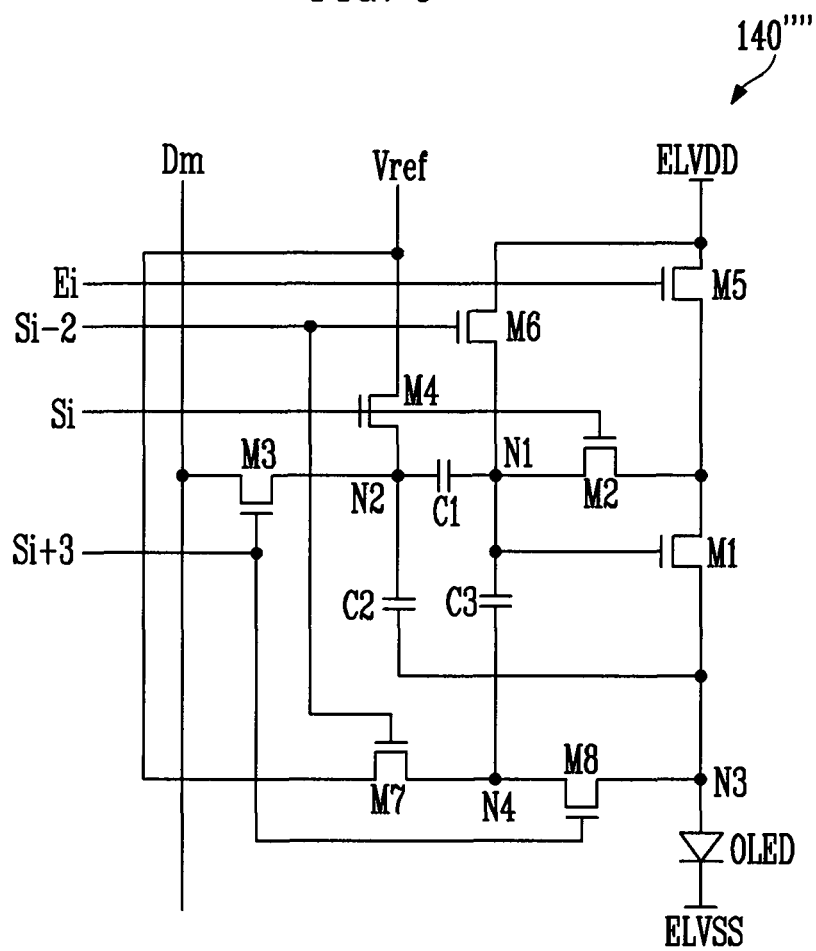
FIG. 9 is a circuit diagram illustrating a pixel according to a fifth embodiment of the present invention.

FIG. 9 is a circuit diagram illustrating a pixel according to a fifth embodiment of the present invention. In the description of FIG. 9, the same reference numerals as those in FIG. 2 are assigned to like elements and their descriptions will be omitted.

Referring to FIG. 9, in a pixel 140'' according to the fifth embodiment of the present invention, a second capacitor C2 is coupled between the third node N3 and the second node N2. The second capacitor C2 stores a voltage corresponding to a difference voltage between the data signal applied to the second node N2 and the third node N3. The second capacitor C2 stores the voltage corresponding to the voltage change of the second node N2 and therefore the voltage corresponding to the data signal can be stably charged.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device comprising:
a scan driver configured to sequentially supply a plurality of scan signals to a plurality of scan lines, each of the scan signals having a width greater than two horizontal periods;
a data driver configured to supply a plurality of data signals to a plurality of data lines; and
a pixel comprising an organic light emitting diode, a pixel circuit comprising a first transistor configured to control an amount of current supplied to the organic light emitting diode, and a compensation circuit comprising a first compensation transistor and a second compensation transistor and configured to control a voltage of a gate electrode of the first transistor to compensate for deterioration of the organic light emitting diode,
wherein the scan driver is configured to supply a current scan signal of the scan signals, which partially overlaps in time with a previous scan signal of the scan signals, and
wherein a gate of the first compensation transistor is controlled by the previous scan signal, and
wherein the second compensation transistor is controlled by a subsequent scan signal.

2. The organic light emitting display device as claimed in claim 1, wherein the scan driver supplies each of the scan signals for a period having a time length of three horizontal periods.

3. The organic light emitting display device as claimed in claim 2, wherein the current scan signal overlaps with the previous scan signal for a period having a time length of one horizontal period.

4. The organic light emitting display device as claimed in claim 2, wherein the scan driver is configured to sequentially supply a plurality of light emission control signals to a plurality of light emission control lines extending in a direction parallel to the scan lines, and to supply an ith light emission control signal of the light emission control signals to an ith light emission control line of the light emission control lines such that the ith light emission control signal overlaps in time with scan signals supplied to an (i−2)th scan line to an (i+3)th scan line, from among the scan signals, wherein i is an integer greater than 2.

5. An organic light emitting display device comprising:
a scan driver configured to sequentially supply a plurality of scan signals to a plurality of scan lines, each of the scan signals having a width greater than two horizontal periods;
a data driver configured to supply a plurality of data signals to a plurality of data lines; and
a pixel comprising an organic light emitting diode, a pixel circuit comprising a first transistor configured to control an amount of current supplied to the organic light emitting diode, and a compensation circuit configured to control a voltage of a gate electrode of the first transistor to compensate for deterioration of the organic light emitting diode, wherein the scan driver is configured to supply a current scan signal of the scan signals, which partially overlaps in time with a previous scan signal of the scan signals, wherein the scan driver is configured to sequentially supply a plurality of light emission control signals to a plurality of light emission control lines extending in a direction parallel to the scan lines, and to supply an ith light emission control signal of the light emission control signals to an ith light emission control line of the light emission control lines such that the ith light emission control signal overlaps in time with scan signals supplied to an (i−2)th scan line to an (i+3)th scan line, from among the scan signals, wherein i is an integer greater than 2, and wherein the pixel circuit comprises:

a second transistor coupled between a first node at a gate electrode of the first transistor and a first electrode of the first transistor and configured to be turned on when the scan signal is supplied to the ith scan line;

a third transistor coupled to a data line of the data lines and a second node and configured to be turned on when a corresponding one of the scan signals is supplied to the (i+3)th scan line;

a first capacitor coupled to the first node and the second node;

a fourth transistor coupled to the second node and a reference power source and configured to be turned on when a corresponding one of the scan signals is supplied to the ith scan line;

a fifth transistor coupled between the first electrode of the first transistor and the first power source and turned off when a corresponding one of the light emission control signals is supplied to the ith light emission control line;

a sixth transistor coupled between the first node and the first power source and configured to be turned on when the scan signal is supplied to the (i−2)th scan line; and a second capacitor for storing a voltage corresponding to the data signal supplied for a period during which the third transistor is turned on.

6. The organic light emitting display device as claimed in claim 5, wherein the second capacitor is coupled between an anode electrode of the organic light emitting diode and the first node.

7. The organic light emitting display device as claimed in claim 5, wherein the second capacitor is coupled between an anode electrode of the organic light emitting diode and the second node.

8. The organic light emitting display device as claimed in claim 5, wherein the reference power source has a voltage higher than a voltage of a data signal corresponding to a black gray level from among the data signals and lower than a voltage of a data signal corresponding to a white gray level from among the data signals.

9. The organic light emitting display device as claimed in claim 5, wherein a seventh transistor is coupled between a control power source and a fourth node, and wherein the compensation circuit further comprises:

an eighth transistor coupled between the fourth node and an anode electrode of the organic light emitting diode; and a third capacitor for controlling a voltage of a gate electrode of the first transistor in response to a voltage change of the fourth node as a common node of the seventh transistor and the eighth transistor, wherein the scan driver is configured to control the seventh and eighth transistors such that at most one of the seventh and eighth transistors is turned on at any time.

10. The organic light emitting display device as claimed in claim 9, wherein the third capacitor is coupled between the fourth node and the first node.

11. The organic light emitting display device as claimed in claim 9, wherein the third capacitor is coupled between the fourth node and the second node.

12. The organic light emitting display device as claimed in claim 9, wherein a voltage of the control power source is substantially equal to that of the reference power source.

13. The organic light emitting display device as claimed in claim 9, wherein the control power source has a voltage lower than a threshold voltage of the organic light emitting diode.

14. The organic light emitting display device as claimed in claim 9, wherein the control power source has a voltage higher than a threshold voltage of the organic light emitting diode.

15. The organic light emitting display device as claimed in claim 9, wherein the seventh transistor is configured to be turned on when the scan signal is supplied to the (i−2)th scan line and the eighth transistor is configured to be turned on when the scan signal is supplied to the (i+3)th scan line.

16. The organic light emitting display device as claimed in claim 1, wherein the data driver is configured to supply the data signal to the data lines during every horizontal period.

17. A pixel comprising:

an organic light emitting diode;

a first transistor configured to control an amount of current supplied to the organic light emitting diode;

a second transistor coupled between a first node at a gate electrode of the first transistor and a first electrode of the first transistor and configured to be turned on when an ith scan signal is supplied to an ith scan line;

a third transistor coupled to a data line and a second node and configured to be turned on when an (i+3)th scan signal is supplied to an (i+3)th scan line;

a first capacitor coupled to the first node and the second node;

a fourth transistor coupled to the second node and a reference power source and configured to be turned on when the ith scan signal is supplied to the ith scan line;

a fifth transistor coupled between the first electrode of the first transistor and a first power source and configured to be turned off when a light emission control signal is supplied to an ith light emission control line;

a sixth transistor coupled between the first node and the first power source and configured to be turned on when an (i−2)th scan signal is supplied to an (i−2)th scan line;

a second capacitor coupled between an anode electrode of the organic light emitting diode and the first node or the second node; and a compensation circuit configured to control a voltage of the first node to compensate for deterioration of the organic light emitting diode, wherein i is an integer greater than 2.

18. The pixel as claimed in claim 17, wherein the reference power source has a voltage higher than a voltage of a data signal corresponding to a black gray level and lower than a voltage of a data signal corresponding to a white gray level.

19. The pixel as claimed in claim 17, wherein the compensation circuit comprises:

a seventh transistor coupled between a control power source and a fourth node;

an eighth transistor coupled between the fourth node and an anode electrode of the organic light emitting diode; and a third capacitor coupled between the fourth node as a common node of the seventh transistor and the eighth transistor and the first node or the second node,
wherein the seventh and eighth transistors are configured such that at most one of the seventh and eighth transistors is turned on at any time.

20. The pixel as claimed in claim 19, wherein a voltage of the control power source is substantially equal to that of the reference power source.

21. The pixel as claimed in claim 19, wherein the control power source has a voltage lower than a threshold voltage of the organic light emitting diode.

22. The pixel as claimed in claim 19, wherein the control power source has a voltage higher than a threshold voltage of the organic light emitting diode.

* * * * *